(12) United States Patent
Hanes (10) Patent No.: US 8,656,067 B2
(45) Date of Patent: Feb. 18, 2014

(54) PERIPHERAL DEVICE IDENTIFICATION FOR PAIRING

(75) Inventor: David H Hanes, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 208 days.

(21) Appl. No.: 13/194,021

(22) Filed: Jul. 29, 2011

(65) Prior Publication Data

US 2013/0031275 A1      Jan. 31, 2013

(51) Int. Cl.
*G06F 3/00* (2006.01)
*G06F 13/00* (2006.01)

(52) U.S. Cl.
USPC ............ 710/15; 710/2; 710/5; 710/8; 710/36

(58) Field of Classification Search
None
See application file for complete search history.

(56) References Cited

U.S. PATENT DOCUMENTS 6,816,067 B2    11/2004  Patton
2009/0063712 A1*  3/2009  Sun et al. ..................... 710/4

* cited by examiner

*Primary Examiner* — Scott Sun (57) ABSTRACT

In one implementation, a pairing device provides an identify instruction to a peripheral device during a pairing process. The peripheral device generates an identification output in response to the identify instruction.

15 Claims, 6 Drawing Sheets

PERIPHERAL DEVICE IDENTIFICATION FOR PAIRING

BACKGROUND

Various peripheral devices can be paired or associated with pairing devices such as desktop computers, laptop computers, or tablet devices to enhance the functionality of those pairing devices. For example, a mouse or keyboard can be paired with a laptop computer to allow the laptop computer to receive input from that mouse or keyboard.

Establishing a pairing between a peripheral device and a pairing device can be difficult in environments with multiple peripheral devices. For example, a user of a pairing device is typically required to select a desired peripheral device from a list of identifiers of peripheral devices detected or enumerated at the pairing device. Unless the user knows the identifier of the desired peripheral device, the user may pair the pairing device with multiple peripheral devices before the pairing device is paired with the desired peripheral device.

DETAILED DESCRIPTION

Peripheral devices can be used with pairing devices to enhance the functionality of the pairing devices. Pairing devices are electronic devices such as desktop computers, laptop or notebook computers, tablet or slate devices, audio/visual (NV) equipment (e.g., televisions, DVD/CD/Blu-ray™ disc players, or stereo receivers), smartphones, or other devices that can be paired or associated with peripheral devices. Peripheral devices are electronic devices such as computer mice, trackpads (e.g., touch- or proximity-sensitive input devices), joystick or game controllers, keyboards, remote control units, audio devices (e.g., speaker systems, headphones, or microphones), or other electronic devices that can be paired or associated and communicate with pairing devices. In some implementations, one pairing device can be a peripheral device to another pairing device.

A peripheral device is paired with a pairing device when the peripheral device and that pairing device are configured to communicate one with other. A pairing is said to exist between paired devices (e.g., a peripheral device paired with or to a pairing device). For example, a peripheral device such as a keyboard is paired with a pairing device such as a tablet device when the keyboard and tablet device are collectively configured such that the tablet device accepts input data (e.g., data related to keystrokes at the keyboard) from the keyboard.

Typically, after a pairing is established or configured between a pairing device and a peripheral device, the pairing device and peripheral device can communicate one with another without further configuration. For example, at least one of the peripheral device and the pairing device can detect or sense when the other is available (e.g., powered on or is accessible via communication link) and begin communicating with the pairing device or the peripheral device, respectively. That is, after the peripheral device and the pairing device are paired, the peripheral device and the pairing device connect one with another by default. In other implementations, after the peripheral device and the pairing device are paired, the peripheral device and the pairing device connect one with another in response to a user command, instruction, or input, for example. As a specific example, a pairing device can be a notebook computer and a peripheral device can be a wireless mouse. After the notebook computer detects that the mouse is available (e.g., powered on and accessible via a wireless communications link), the notebook computer (or a software application hosted at the notebook computer) can ask a user if he or she would like the notebook computer to connect to the paired mouse. The notebook computer can then connect or not connect to the paired mouse based on input from the user.

A pairing can be exclusive to a pairing device, to a peripheral device, or to both a pairing device and a peripheral device. That is, for example, a pairing device paired with a peripheral device can accept input data from and/or provide output data to only that peripheral device (or to that peripheral device and to peripheral devices of types or classes that are different from the type or class of that peripheral device). Alternatively, for example, a peripheral device paired with a pairing device can accept input data from and/or provide output data to only that pairing device. As yet another example, a peripheral device and a pairing device that are paired can accept input data from and/or provide output data to only one another.

Implementations discussed herein provide feedback to a user during a pairing process that allows the user to determine with which peripheral device a pairing device will pair. More specifically, for example, a pairing device can provide an identify instruction (or command) to a peripheral device after enumerating a group of peripheral devices. An identify instruction is a signal, command, or data set that instructs a peripheral device to produce or generate an identification output. The peripheral device generates an identification output that is perceptible to the user (e.g., a visual output, an audio output, or a haptic output) in response to the identify command. As a more specific example, an identification output is a visual output, an audio output, or a haptic output at the peripheral device.

The user can then provide a pairing instruction to the pairing device (e.g., via a graphical user interface or textual user interface) to indicate whether the pairing device should pair with the peripheral device currently identifying itself. That is, the pairing instruction indicates whether the peripheral device with which the user would like the pairing device to pair is identifying itself. A pairing instruction is a signal, command, or data set that describes whether the pairing device should pair with the peripheral device currently identifying itself. If the pairing instruction indicates that the desired peripheral device is identifying itself (e.g., the input from the user indicates that that peripheral device is generating the identification output), the pairing device can initiate a pairing session with the peripheral device to establish a pairing between the pairing device and the peripheral device in response to the input from the user.

Alternatively, if the pairing instruction indicates that the desired peripheral device is not identifying itself (e.g., the input from the user indicates that that peripheral device is not generating the identification output), the pairing device can provide a cease identify instruction (or command) to the peripheral device to which the identify instruction was provided, and provide an identify instruction to another enumerated peripheral device. An cease identify instruction is a signal, command, or data set that instructs a peripheral device to disable or halt an identification output. This process can be repeated until the user indicates that the desired peripheral device (i.e., the peripheral device with which the user would like the pairing device to pair) is identifying itself and that peripheral device and the pairing device are paired, or until all enumerated peripheral devices have been provided with an identify instruction.

Because the pairing device can instruct the peripheral devices to identify themselves by generating an identification output, a user need not determine with which peripheral device a pairing device should pair based on identification information provided to the pairing device by the peripheral device. Rather, the user can observe or perceive the identification output, and then indicate to the pairing device that the desired peripheral device is generating the identification output. The pairing device then pairs with the desired peripheral device in response to the indication from the user. Accordingly, the user need not be able to select the desired peripheral device from a list of enumerated peripheral devices.

As used herein, the singular forms "a," "an," and "the" include plural referents unless the context clearly dictates otherwise. Thus, for example, the term "identify instruction" is intended to mean one or more identify instructions or a combination of identify instructions. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted or at a processor), or hardware and software hosted at hardware.

Figure 1:
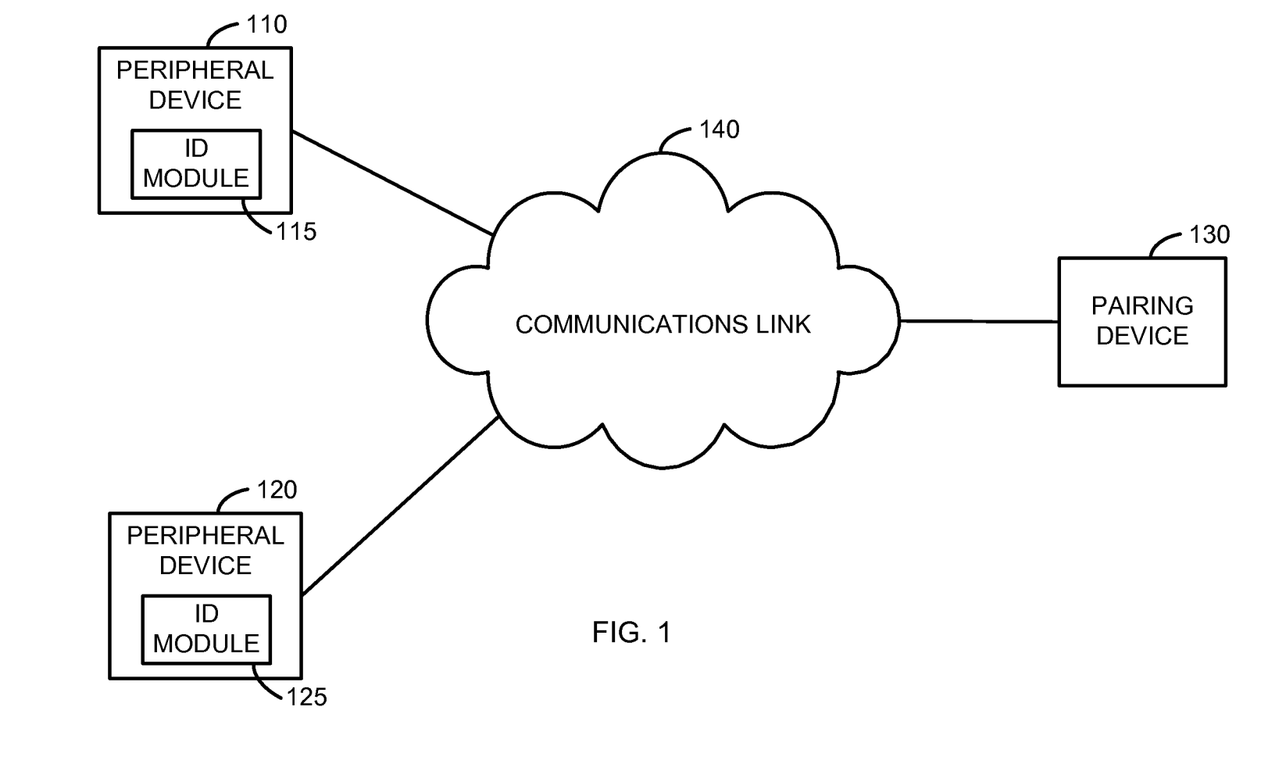
FIG. 1 is an illustration of an environment including a paring device and peripheral devices, according to an implementation.

FIG. 1 is an illustration of an environment including a paring device and peripheral devices, according to an implementation. The environment illustrated in FIG. 1 includes peripheral device 110, peripheral device 120, pairing device 130, and communications link 140. Peripheral devices 110 and 120 communicate with pairing device 130 via communications link 140. Communications link 140 includes devices, services, or combinations thereof that define a communications path between peripheral device 110, peripheral device 120, pairing device 130, or other devices or services (not illustrated). For example, communications link 140 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Accordingly, peripheral device 110, peripheral device 120, and pairing device 130 can be coupled to communication link 140 using cables (e.g., electrical or optical cables) or wirelessly.

Communications link 140 can include communications networks such as an intranet, the Internet, telecommunications networks, or a combination thereof. Additionally, communications link 140 can include access points (e.g., devices via which devices can be connected or coupled to a communications network and/or other devices), proxies, routers, switches, gateways, bridges, load balancers, and similar communications devices. Furthermore, the connections or communications paths illustrated in FIG. 1 are logical and do not necessarily reflect physical connections. As an example, peripheral devices 110 and 120 can be coupled to communication link 140 via at a common (i.e., at the same) physical medium.

Pairing device 130 can be paired with peripheral device 110 and/or peripheral device 120 to exchange data with peripheral device 110 and/or peripheral device 120. For example, functionality of pairing device 130 can be extended (or enhanced) by pairing with peripheral device 110 and/or peripheral device 120.

Peripheral device 110 includes identification module (labeled "ID MODULE") 115 and peripheral device 120 includes identification module (labeled "ID MODULE") 125. Peripheral device 110 receives an identify instruction from pairing device 130 and identification module 115 generates an identification output in response to the identify instruction. Peripheral device 120 and identification module 125 are similarly configured. An identification module can include a variety of components or elements to generate an identification output such as, for example, a light emitting diode (LED), a display, a buzzer, a speaker, a motor or solenoid, or some other output device. That is, identification module can generate a visual output, an aural output, a haptic output, a combination thereof, or some other output at a peripheral device that can be perceived by a user of pairing device 130.

Figure 2:
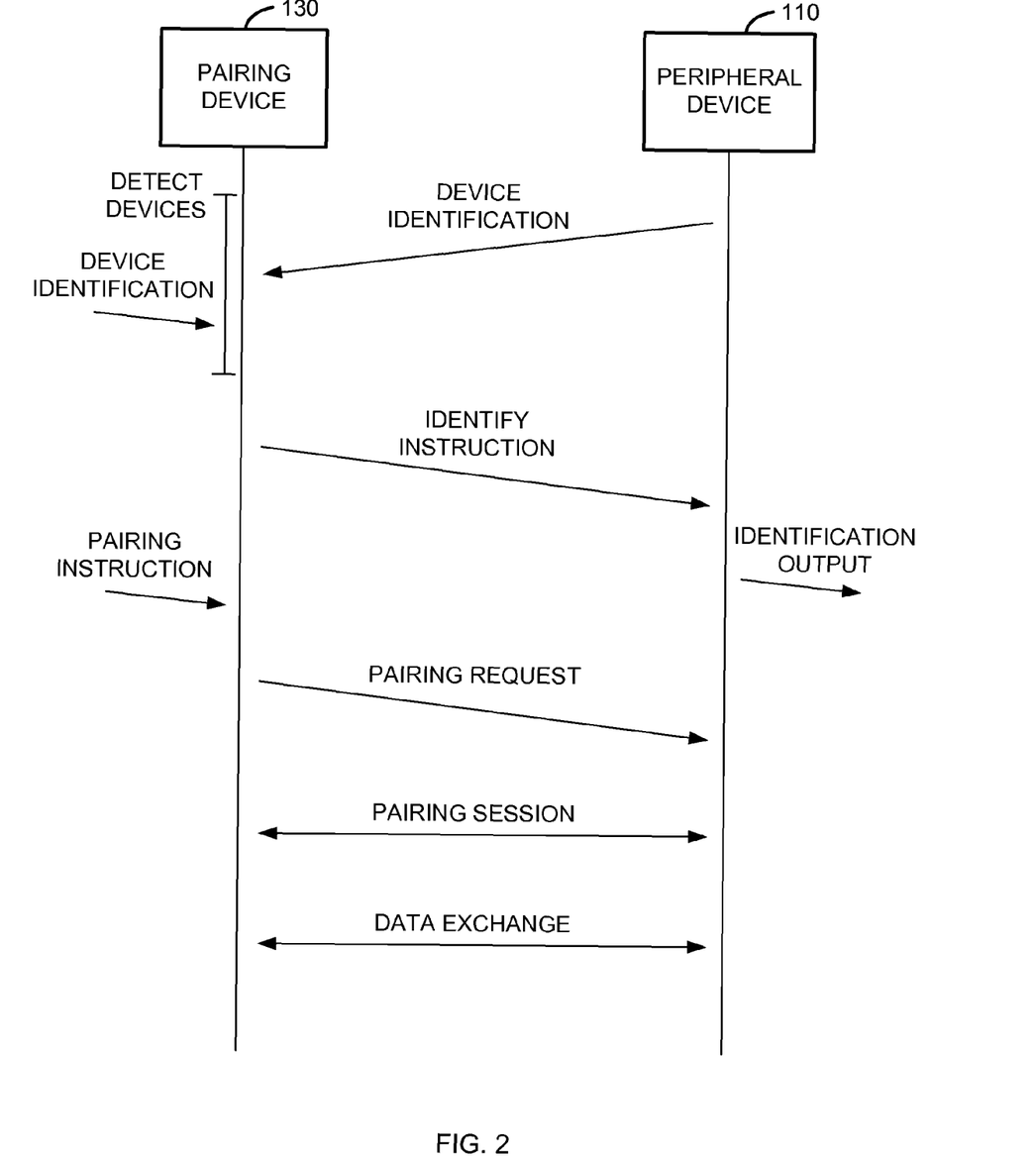
FIG. 2 is a communication flow diagram illustrating commmunication between a pairing device and a peripheral device, according to an implementation.

FIG. 2 is a communication flow diagram illustrating communication between a pairing device and a peripheral device, according to an implementation, and illustrates interaction between pairing device 130 and peripheral device 110 illustrated in FIG. 1 to establish a pairing. Pairing device 130 detects peripheral devices (e.g., listens at or monitors a communications link for identification information associated with peripheral devices). For example, as illustrated in FIG. 2, pairing device 130 receives device identifications (or identification information related to devices) from peripheral device 110 and other peripheral devices (e.g., peripheral device 120 illustrated in FIG. 1) to enumerate available peripheral devices. Pairing device 130 then provides an identify instruction to peripheral device 110. In some instances, pairing device 130 provides one or more identify instructions to other peripheral devices from which device identifications were received. Peripheral device 110 then generates an identification output in response to the identify instruction.

Pairing device 130 then receives a pairing instruction. For example, the pairing instruction can be received in response to input from a user indicating that peripheral device 110 is identifying itself (e.g., is generating an identification output). If the pairing instruction is a do not pair command, pairing device 130 can provide an identify instruction to another peripheral device and/or can provide a cease identify instruction to peripheral device 110. A do not pair command is a pairing instruction that instructs a pairing device to not pair with a particular peripheral device (e.g., the peripheral device currently identifying itself). If the pairing instruction is an establish pairing command, pairing device 130 provides a pairing request to peripheral device 110 as illustrated in FIG. 2 to initiate a pairing session between pairing device 130 and peripheral device 110. An establish pairing command is a pairing instruction that instructs a pairing device to pair with a particular peripheral device (e.g., the peripheral device currently identifying itself). A pairing request is a signal, command, or data set that indicates that a peripheral device is allowed to or should pair or participate in a pairing session with a pairing device.

After the pairing session, pairing device 130 and peripheral device 110 are paired and data is exchanged between pairing device 130 and peripheral device 110. For example, audio or visual data can be provided from pairing device 130 to peripheral device 110 (e.g., peripheral device 110 is a speaker device or display device, respectively), or from peripheral device 110 to pairing device 130 (e.g., peripheral device 110 is a an audio input device such as a microphone or a image- or video-capture device such as a camera, respectively).

Figure 3:
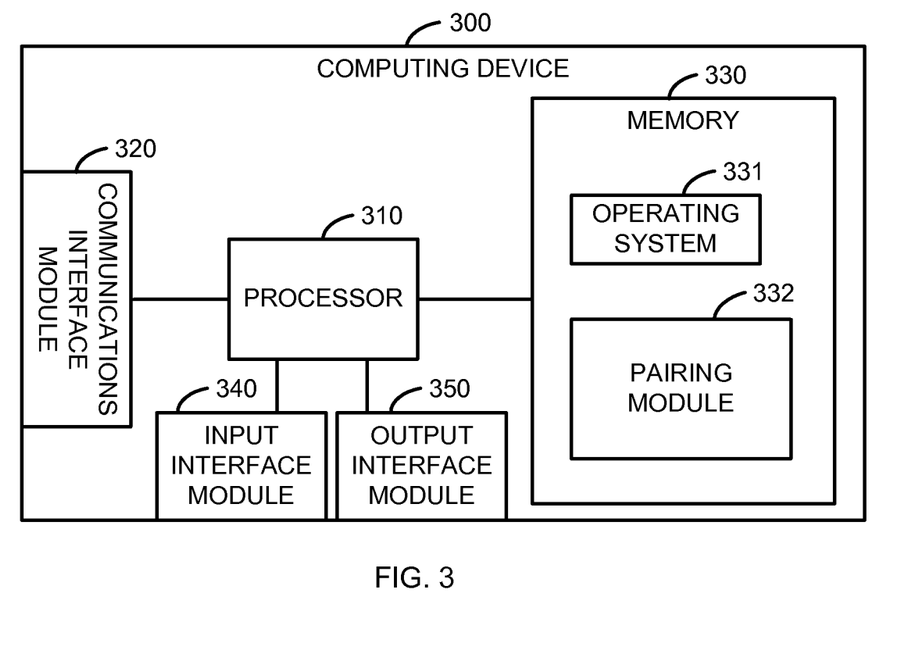
FIG. 3 is a schematic block diagram of a computing device configured as a pairing device, according to an implementation.

FIG. 3 is a schematic block diagram of a computing device configured as a pairing device, according to an implementation. For example, as illustrated in FIG. 3, computing device 300 hosts or executes pairing module 332 at processor 310, causing processor 310 (or computing device 300) to function or operate as a pairing device. As a specific example, pairing module 332 can include instructions or code that when executed at processor 310 cause processor 310 (alone or together with other components of computing device 300) to perform process 500 discussed below in relation to FIG. 5.

Figure 4:
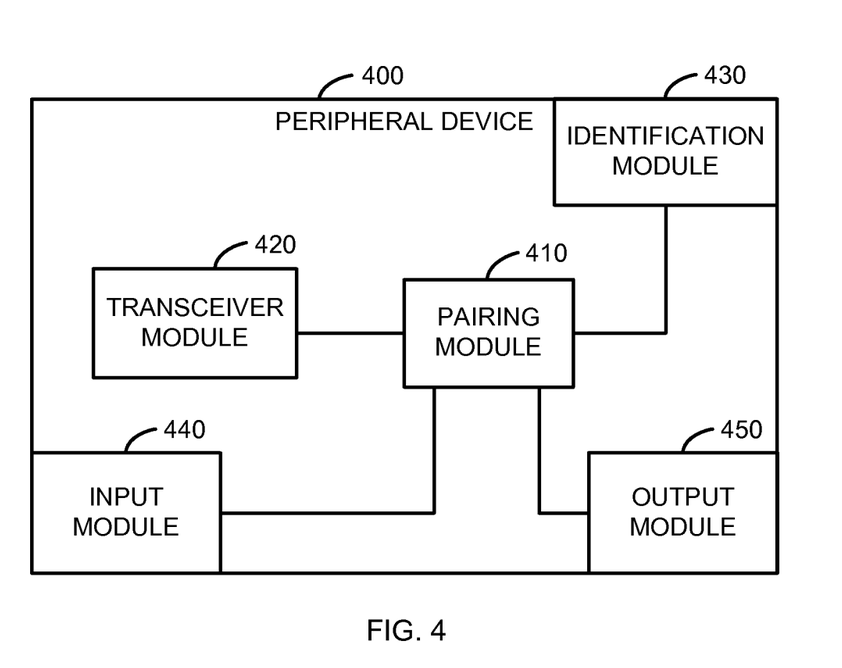
FIG. 4 is a schematic block diagram of a peripheral device, according to an implementation.

Although various modules are illustrated and discussed in relation to FIGS. 3 and 4 and other example implementations, other combinations or sub-combinations of modules can be included within other implementations. Said differently, although the modules illustrated in FIGS. 3 and 4 and discussed in other example implementations perform specific functionalities in the examples discussed herein, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Computing device 300 includes processor 310, communications interface module 320, memory 330, input interface module 340, and output interface module 350. Processor 310 is any combination of hardware and software that executes or interprets instructions, codes, or signals. For example, processor 310 can be a microprocessor, an application-specific integrated circuit (ASIC), a distributed processor such as a cluster or network of processors or computing device, or a virtual machine.

Communications interface module 320 is a module in communication with processor 310 via which computing device 300 communicates (e.g., exchange symbols or signals representing data or information) with other computing devices and/or services via, for example, a communications link. Communications interface module 320 can include hardware (e.g., pins, connectors, or integrated circuits) and software (e.g., drivers or communications stacks). For example, communications interface module 320 can implement an electrical communications interface, an optical communications interface, a wireless communications interface, an Ethernet interface, a Fiber Channel interface, an InfiniBand interface, or another communications interface.

Memory 330 is a non-transitory processor-readable medium that stores instructions, codes, data, or other information. For example, memory 330 can be a volatile random access memory (RAM), a persistent data store such as a hard disk drive or a solid-state drive, or a combination thereof or other memories. Furthermore, memory 330 can be integrated with processor 310, separate from processor 310, or external to computing device 300.

In some implementations, memory 330 can include a variety of memories or other processor-readable media. For example, memory 330 can a compact disc (CD), a digital video disc (DVD), a Secure Digital™ (SD) memory card, a MultiMediaCard (MMC) memory card, a CompactFlash™ (CF) memory card, or a combination thereof.

Input interface module 340 receives input signals and provides data related to the input signals (or input data) to processor 310. For example, input interface module 340 can receive input signals from a mouse, keyboard, touch- or proximity-sensitive input device at which a user can provide input such as pairing instructions to computing device 300. Similarly, output interface module 350 receives output data from processor 310 and generates output signals based on those output data. For example, output interface module 350 can provide output signals to a display, an audio device such as a speaker, or some other output device at which information can be output to a user. In some implementations, input interface module 340 and output interface module 350 can be a single interface module or can be coupled to a common device. As an example, input interface module 340 and output interface module 350 can be coupled to a touch-sensitive display from which input signals are received and to which output signals are generated or provided.

As illustrated in FIG. 3, memory 330 includes operating system 331 and pairing module 332. Operating system 331 and pairing module 332 are each instructions or code that— when executed at processor 310—cause processor 310 to perform operations that implement, respectively, operating system 331 and pairing module 332. Said differently, operating system 331 and pairing module 332 are hosted at computing device 300. For example, the instructions or codes of pairing module 332 can cause processor 310 to access or interact with communications interface module 320, input interface module 340, and/or output interface module 350 to receive identification information from peripheral devices, enumerate the peripheral devices, send identify instructions to one or more peripheral devices, receive one or more pairing instructions from a user, and establish a pairing with a peripheral device.

As discussed above, memory 330 can be or include a variety of memories or other processor-readable media. In such implementations, operating system 331, paring module 332, and/or other modules of computing device 300 can be located or stored at different memories or other processor-readable media. For example, operating system 331 can be stored at a hard disk drive, pairing module 332 can be stored at a DVD, and other modules can be stored at an SD memory card.

In some implementations, computing device 300 can be a virtualized computing device. For example, computing device 300 can be hosted as a virtual machine at a computing server. Moreover, in some implementations, computing device 300 can be a virtualized computing appliance, and operating system 331 is a minimal or just-enough operating system to support (e.g., provide services such as a communications stack and access to components of computing device 300 such as communications interface module 320, input interface module 340, and output interface module 350 to) pairing module 332.

Pairing module 332 can be accessed or installed at computing device 300 from a variety of memories or other processor-readable media. For example, computing device 300 can access a remote processor-readable medium via communications interface module 320 and access pairing module 332 or an installation package including pairing module 332 at that processor-readable medium. As a specific example, computing device 300 can be a thin client that accesses operating system 331 and pairing module 332 during a boot sequence.

As another example, computing device 300 can include 3a processor-readable medium access device (e.g., CD, DVD, SD, MMC, or a CF drive or reader) and access pairing module 332 at a processor-readable medium via that processor-readable medium access device. As a more specific example, the processor-readable medium access device can be a DVD drive at which a DVD including an installation package for pairing module 332 is accessible. The installation package can be executed or interpreted at processor 310 to install pairing module 332 at computing device 300 (e.g., at memory 330). Computing device 300 can then host or execute pairing module 332.

FIG. 4 is a schematic block diagram of a peripheral device, according to an implementation. Peripheral device 400 includes pairing module 410, transceiver module 420, identification module 430, input module 440, and output module 450. Pairing module 410 communicates with transceiver module 420 and identification module 430 to identify peripheral device 400. Additionally, pairing module 410 communicates with transceiver module 420, input module 440, and output module 450 to provide input data to and generate output signals based on output data received from a pairing device. In some implementations, transceiver module 420 includes receive and transmit capabilities or functionalities. In other implementations, transceiver module 420 includes receive capabilities or functionalities and does not include transmit capabilities. Moreover, transceiver module 420 can be a single module or combination modules.

More specifically, in some implementations, pairing module 410 can be configured in a pairing mode in which pairing module 410 sends identification information via transceiver module 420 (e.g., pairing module 410 provides the identification information to transceiver module 420, and transceiver module 420 sends the identification information) to one or more pairing devices. The identification information can be sent via unicast addressing, multicast addressing, and/or broadcast addressing. The identification information can include an identifier such as a hardware address, a logical address, a description of peripheral device 400, and/or additional or other information that identifies or describes peripheral device 400.

Additionally while in the pairing mode, pairing module 410 can receive an identify instruction from, for example, a pairing device via transceiver module 420, and provide a signal, command, or instruction to identification module 430 to generate an identification output at identification module 430. The identification output can be any or a combination of identification outputs such as a visual output, an aural output, or a haptic output. In some implementations, the identify instruction can define or describe a pattern, type or class of identification output (e.g., visual output, an aural output, or a haptic output), or duration of an identification output. Moreover, pairing module 410 can receive a cease identify instruction from, for example, a pairing device via transceiver module 420, and provide a signal, command, or instruction (or suspends a signal, command, or instruction) to identification module 430 to cease or disable an identification output at identification module 430.

Furthermore, while in the pairing mode, pairing module 410 can receive a pairing request from a pairing device via transceiver module 420, and participate in a pairing session with the pairing device to establish a pairing with the pairing device. A pairing session includes communication between the pairing device and peripheral device 400 to establish the pairing. For example, identification information, cryptographic keys, security policy information, pass or key codes, and/or other information can be exchanged between the pairing device and peripheral device 400, verified, and/or authenticated during a pairing session. In other words, the pairing device and peripheral device 400 communicate during a pairing session to access, store, verify, and/or authenticate information that will be used to communicate one with another at a later time (e.g., after pairing module 410 exits or completes the pairing mode).

After peripheral device 400 is paired with a pairing device, pairing module 410 exits the pairing mode, and the pairing device and peripheral device 400 exchange data. In some implementations, peripheral device 400 receives output data from the pairing device (e.g., at or via transceiver module 420) and generates output signals at output module 450 based on the output data. In other implementations, peripheral device 400 generates input signals at input module 440, and sends input data to the pairing device. In yet other implementations, peripheral device 400 both receives output data from the pairing device and sends input data to the pairing device. In other words, after peripheral device 400 is paired with a pairing device, the functionality of the pairing device can be enhanced by sending data to and/or receiving data from peripheral device 400.

As specific examples of input module 440, input module 440 can be any of a variety of input modules including an array of buttons for a keyboard, keypad or mouse, an optical or mechanical movement sensor for a mouse, a position detector for a joystick, a microphone, an image sensor, a touch- or proximity-sensitive device, or other input devices. As specific example, of output module 450, output module 450 can be any of a variety of output modules including audio amplifiers, audio speakers, a visual display (e.g., a liquid crystal display (LCD) or LED array), a motor or solenoid, or other output devices.

Figure 5:
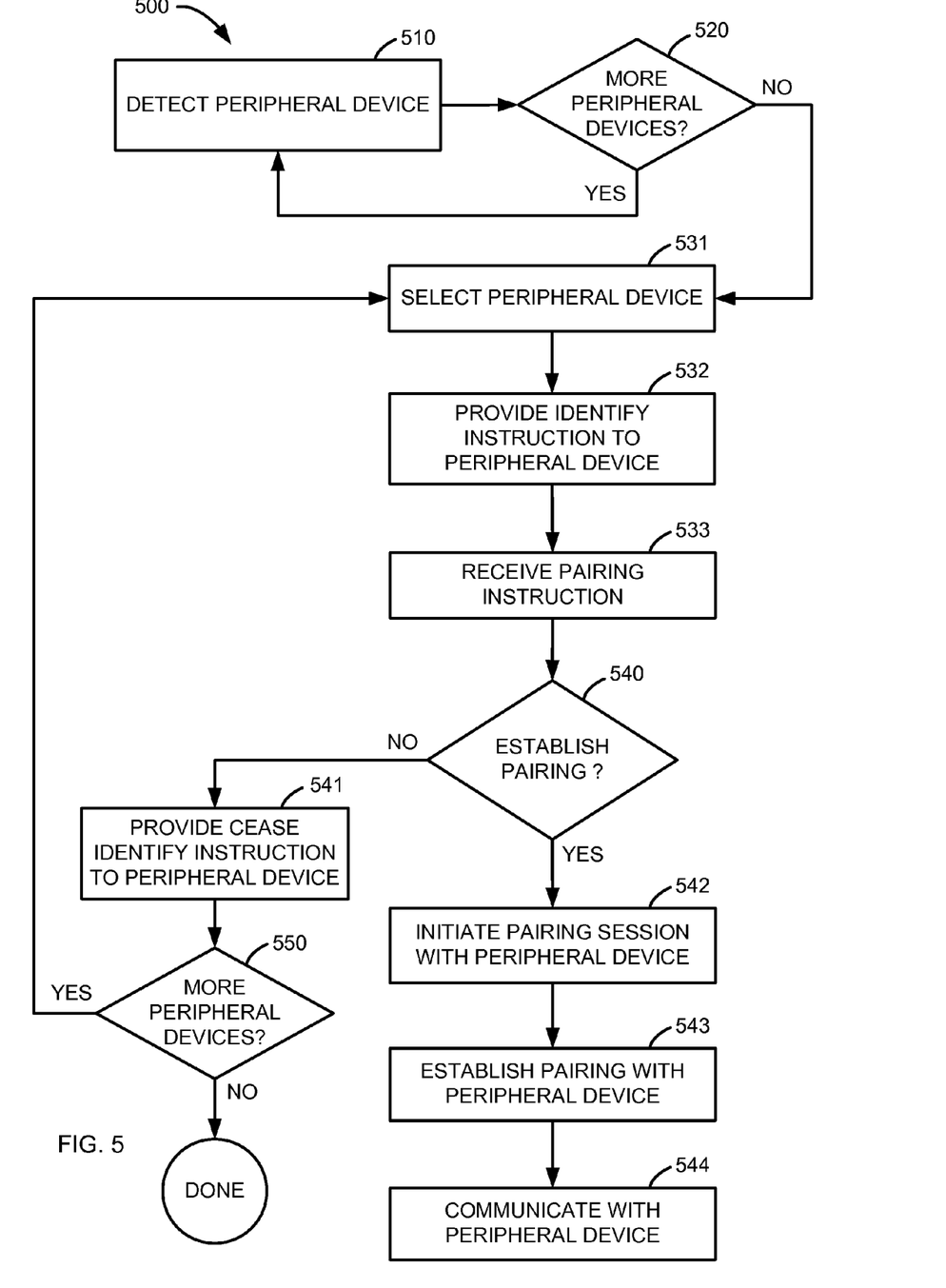
FIG. 5 is a flowchart of a pairing process at a pairing device, according to an implementation.

FIG. 5 is a flowchart of a pairing process at a pairing device, according to an implementation. For example, process 500 can be implemented at a pairing module hosted at a computing device such as pairing module 332 illustrated in FIG. 3. A peripheral device is detected at block 510. For example, a peripheral device can broadcast identification information at regular intervals or particular times, and the pairing device (i.e., the pairing device implementing process 500) can detect that peripheral device by receiving the identification information. Alternatively, for example, the pairing device can detect a peripheral device by sending (e.g., via unicast addressing, multicast addressing, or broadcast addressing) an enumerate request, and receiving identification information provided by the peripheral device in response to the enumerate request. An enumerate request is a signal, command, or data set that indicates that one or more peripheral devices can or should provide identification information.

If there are more peripheral devices, at block 520, process 500 returns to block 510 to detect another peripheral device. For example, multiple peripheral devices can provide identification information in response to an enumeration request, and the pairing device can perform block 510 for each peripheral device. In some implementations, the pairing device can iterate between blocks 510 and 520 to detect or listen for identification information from peripheral devices for a period of time (e.g., a predetermined period of time or a dynamically determined period of time).

If there are no more peripheral devices at block 520, process 500 proceeds to block 531 at which a peripheral device is selected from a group of peripheral devices identified or enumerated at blocks 510 and 520. In some implementations, the peripheral device is selected from the group of enumerated peripheral devices based on selection criteria or a policy. In some implementations, the peripheral device is selected in response to input from a user received via an input interface module and/or output interface module of a pairing device. For example, the user can identify the peripheral device at a user interface defined at a display by a pairing module (e.g., the user provides input at a graphical user interface or a command line interface), and the pairing module selects that peripheral device in response to input from the user. In other implementations, peripheral devices are selected in the order they were detected at blocks 510 and 520, or in some other order, without input from a user.

An identify instruction is then provided at block 532 to the peripheral device selected at block 531. For example, an identify instruction can be provided to the peripheral device via a communications link. Alternatively, for example, the identify instruction can be stored at a location or resource such as an electronic mailbox at which the peripheral device selected at block 531 can access the identify instruction. In other words, the identify instruction can be pushed to the peripheral device or the peripheral device can pull the identify instruction from the pairing device or from a resource accessible to the peripheral device.

A pairing instruction is then received at block 533. The pairing instruction can be received, for example, from a user via an input interface module and/or output interface module of the pairing device. For example, the user can indicate at a graphical user interface whether a desired peripheral device is identifying itself (e.g., generating an identification output).

The pairing instruction indicates whether a desired peripheral device is generating an identification output, for example, in response to the identify instructions provided at block 532. In other words, the pairing instruction indicates whether the peripheral device to which the identify instruction was provided at block 532 is the peripheral device with which the pairing device should pair. The pairing instruction can be an establish pairing command or a do not pair command.

If the pairing instruction is a do not pair command at block 540, process 500 proceeds to block 541 to provide a cease identify instruction to the peripheral device selected at block 531. Process 500 then proceeds to block 550 to determine whether there are additional peripheral devices that were enumerated at blocks 510 and 520. That is, whether there are peripheral devices that were detected at blocks 510 and 520 to which identify instructions have not yet been provided. If there are such additional peripheral devices, process 500 returns to block 531 to select another peripheral device. If there are no such additional peripheral devices, process 500 completes. For example, the pairing device can notify a user via a graphical user interface that the pairing device was not paired with a peripheral device.

Referring to block 540, if the pairing instruction is an establish pairing command, process 500 proceeds to block 542 at which a pairing session is initiated with the peripheral device to which the identify instruction was provided at block 532 (i.e., during the most recent iteration of blocks 531 and 532). The pairing session can be initiated by providing a pairing request to that peripheral device.

A pairing is established with that peripheral device at block 543 during a pairing session. As discussed above, the pairing device and the peripheral device exchange information and/or store information one about another during the pairing session to establish the pairing. For example, the pairing device can store an identifier and/or connection information such as cryptographic keys or pass codes of the peripheral device at a database or index of paired peripheral devices with which the pairing device communicates to enhance one or more functionalities of the pairing device. Similarly, the peripheral device can store an identifier and/or connection information such as cryptographic keys or pass codes of the pairing device at a memory location such as a register or file.

After the pairing is established (the pairing device and peripheral device are paired), the pairing device and peripheral device communicate at block 544. For example, input data can be received at the pairing device from the peripheral device. In some implementations, output data can be provided to the peripheral device from the pairing device. Input data can include, mouse events (e.g., movement information or button state information), keyboard events (e.g., key state information), visual data (e.g., images), audio data, or other input data, for example, based on signals received at or generated by the peripheral device. Output data can include audio, visual, or textual data.

FIG. 5 illustrates an example process at a pairing device. In other implementations, process 500 can include additional, different, and/or rearranged blocks with respect to those illustrated in FIG. 5. For example, process 500 can omit block 541, and the peripheral device to which the identify instruction was sent at block 532 can disable its identification output if no pairing request is received for a period of time after a pairing device implementing process 500 provided the identify instruction. As another example, process 500 can omit blocks 510 and 520 in some implementations. In such implementations, a pairing device implementing process 500 can, for example, access identification information related to a group of peripheral devices at a data store such as a database or receive such identification information from a resource or service that monitors or listens for identification information associated with peripheral devices.

Figure 6:
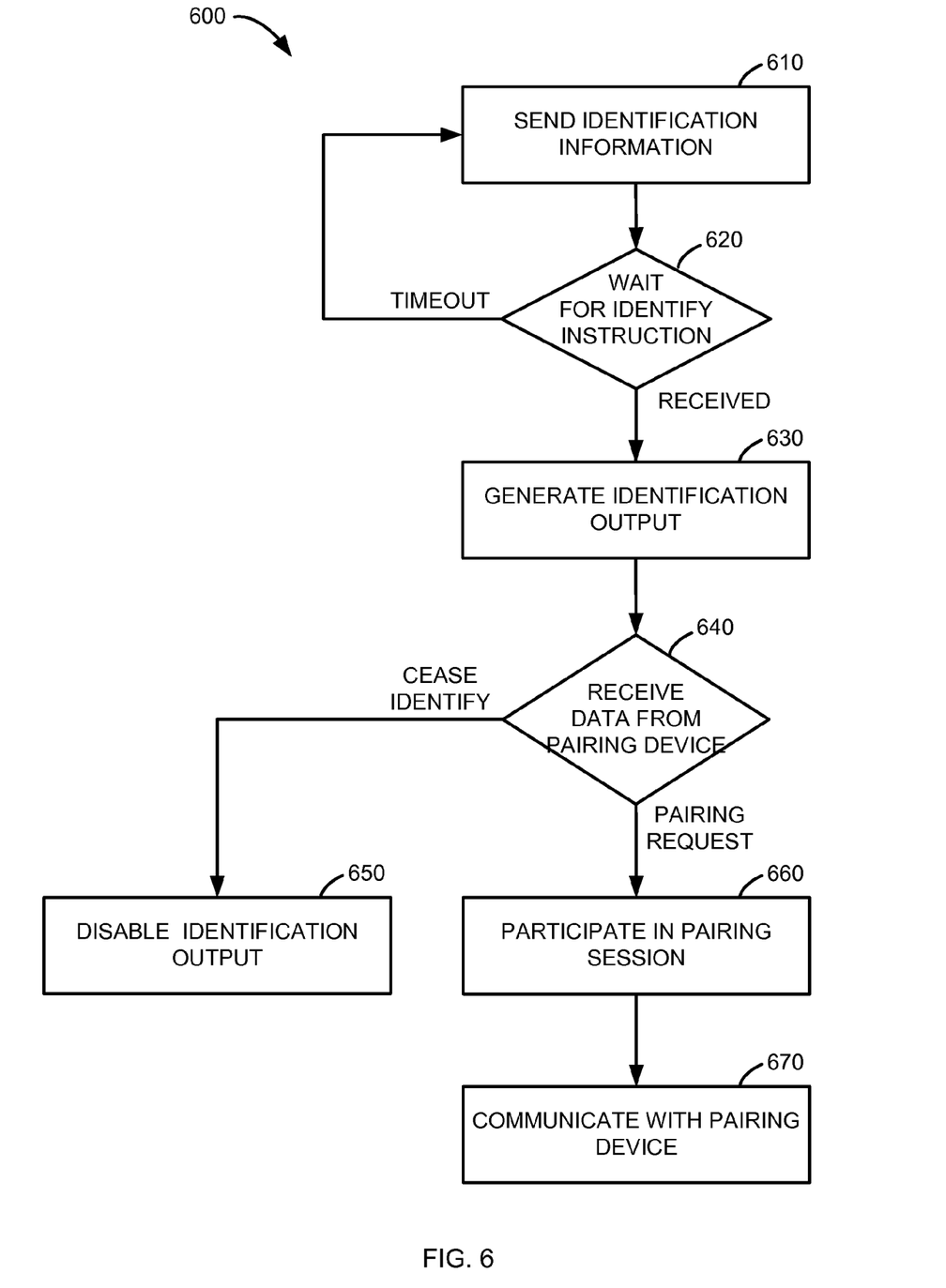
FIG. 6 is a flowchart of a pairing process at a peripheral device, according to another implementation.

FIG. 6 is a flowchart of a pairing process at a peripheral device, according to another implementation. For example, process 600 can be implemented at a pairing module of a peripheral device such as peripheral device 400 illustrated in FIG. 4. As illustrated in FIG. 6, identification information is sent from the peripheral device (i.e., the peripheral device implementing process 600) at block 610. Process 600 then waits at block 620 for an identify instruction or a timeout. If a timeout occurs (e.g., the end of an interval after which identification information should be sent again), process 600 returns to block 610 to again send identification information. In other implementations, process 600 waits at block 620 for an identify instruction or for an enumeration request, for example, from a pairing device. That is, the peripheral device sends identification information in response to enumeration requests.

If an identify instruction is received at block 620, an identification output is generated at block 630. For example, a visual, aural, or haptic output can be generated at the peripheral device as identification information in response to an identify instruction. In other words, the peripheral device identifies itself by generating identification output in response to the identify instruction. The identification output can identify the peripheral device to a user. Thus, a pairing device can send an identify instruction to the peripheral device, and the user can confirm to the pairing device (e.g., via a user interface of the pairing device) that the peripheral device, which is presently identifying itself, is a peripheral device with which the pairing device should pair.

Process 600 then waits at block 640 for additional data from a pairing device. If the peripheral device receives a cease identify instruction at block 640, the identification output is disabled or stopped at block 650. Alternatively, in some implementations, process 600 proceeds to block 650 from block 640 after a period of time has passed since the identify instruction was received at block 620. That is, the peripheral device can identify itself for a period of time, and then cease to identify itself if no data has been received from the pairing device.

Alternatively, if a pairing request is received at block 640, the peripheral device participates in a pairing session at block 660 to establish a pairing with the pairing device. As discussed above, the pairing device and the peripheral device exchange information and/or store information one about another during the pairing session to establish the pairing. For example, the peripheral device can store an identifier and/or connection information such as cryptographic keys or pass codes of the pairing device at a memory location such as a register or file.

In some implementations, receipt of a pairing request at block 640 or execution of block 660 implies a cease identify instruction. Said differently, a peripheral device can cease an identification output if a pairing request is received at block 640 or as part of block 660, for example.

The peripheral device then communicates with the pairing device at block 670 to enhance functionality of the pairing device. For example, the peripheral device can provide input data to the pairing device. Additionally or alternatively, the peripheral device can, for example, generate output signals (e.g., aural, visual, or haptic signals) based on output data received from the pairing device. In other words, the peripheral device can function as an output device and/or input device of the pairing device after the pairing device and the peripheral device are paired.

FIG. 6 illustrates an example process at a pairing device. In other implementations, process 600 can include additional, different, and/or rearranged blocks with respect to those illustrated in FIG. 6. For example, process 600 can include an additional block before block 610 at which the peripheral device is configured in a pairing mode. For example, this block can be performed in response to depression of a button or other session performed by a user to causes the peripheral module to perform blocks 610-660. In such implementations, process 600 can also include another block between blocks 660 and 670 at which the peripheral device exits the pairing mode.

Figure 7:
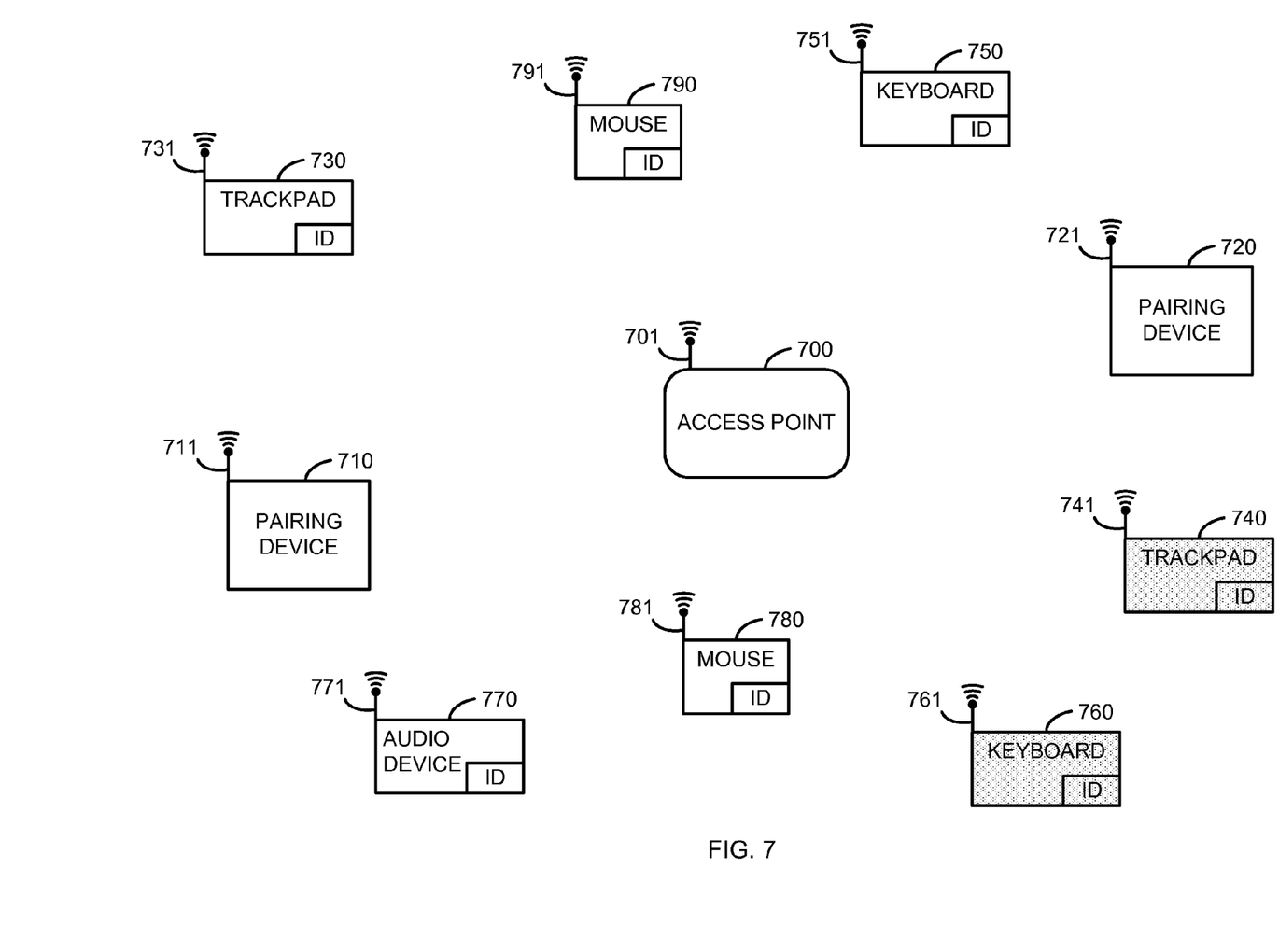
FIG. 7 is an illustration of an environment including peripheral devices and pairing devices in communication one with another via an access point, according to an implementation.

FIG. 7 is an illustration of an environment including peripheral devices and pairing devices in communication one with another via an access point, according to an implementation. The environment illustrated in FIG. 7 includes access point 700, pairing devices 710 and 720, trackpads 730 and 740, keyboards 750 and 760, audio device 770, and mice 780 and 790. Trackpads 730 and 740, keyboards 750 and 760, audio device 770, and mice 780 and 790 are peripheral devices.

Access point 700 includes antenna 701, pairing devices 710 and 720 include antennas 711 and 721, respectively, trackpads 730 and 740 include antennas 731 and 741, respectively, keyboards 750 and 760 include antennas 751 and 761, respectively, audio device 770 includes antenna 771, and mice 780 and 790 include antennas 781 and 791, respectively. Each of pairing devices 710 and 720, trackpads 730 and 740, keyboards 750 and 760, audio device 770, and mice 780 and 790 communicates wirelessly with access point 700 and with other devices via access point 700. That is, access point 700 is an intermediary device between pairing devices 710 and 720, trackpads 730 and 740, keyboards 750 and 760, audio device 770, and mice 780 and 790.

Access point 700 can be, for example, a wireless access point for a communication network such as an Ethernet network, a router in an IEEE 802.11 or Wi-Fi™ network, a bridge, a gateway, or some other device that communicates wirelessly with pairing devices 710 and 720, trackpads 730 and 740, keyboards 750 and 760, audio device 770, and mice 780 and 790. In some implementations, access point 700 can also communicate with other devices via a wired communications link (not shown). For example, other pairing devices (not illustrated) can be operatively coupled to access point 700 via a wired communication link (not illustrated) such as a communications cable. Although the environment of FIG. 7 will be discussed in relation to wireless communications links with access point 700, in other environments or implementations, pairing devices and/or peripheral devices can communicate one with another via wired communications links and/or a combination of wired communications links and wireless communications links.

Each of trackpads 730 and 740, keyboards 750 and 760, audio device 770, and mice 780 and 790 includes an identification module (labeled "ID"), at which identification output can be generated in response to identify instructions from one or both of pairing devices 710 and 720. Trackpad 740 and keyboard 760 are each paired with a pairing device (e.g., pairing device 710, pairing device 720, or another pairing device). Trackpad 730, keyboard 750, audio device 770, and mice 780 and 790 are in a pairing mode and each sends identification information which can be received by pairing devices 710 and 720 via access point 700. That is, for example, trackpad 730, keyboard 750, audio device 770, and mice 780 and 790 can broadcast information which is received at access point 700 and forwarded to other devices including pairing devices 710 and 720.

In this example, a user (not illustrated) of pairing device 710 would like to pair mouse 790 with pairing device 720 to use mouse 790 as an input device for pairing device 720. The user interacts with a user interface of pairing device 720 to cause pairing device 720 to enumerate available peripheral devices. As a result, trackpad 730, keyboard 750, audio device 770, and mice 780 and 790 are detected at pairing device 720. As a specific example, pairing device 720 waits or listens for identification information for ten seconds to enumerate available peripheral devices, and trackpad 730, keyboard 750, audio device 770, and mice 780 and 790 each broadcast identification information every three seconds. Trackpad 740 and keyboard 760 are not detected because these peripheral devices are not in a pairing mode and are not presently sending identification information.

Pairing device 720 then serially sends identify instructions to the enumerated or detected peripheral devices. For example, pairing device 720 first sends an identify instruction to keyboard 750 and prompts the user to indicate via the user interface whether the desired peripheral device—here, mouse 790—is identifying itself. In response to the identify instruction, the identification module at keyboard 750 generates an identification output (e.g., an LED is illuminated according to a pattern). The user can then input to pairing device 720 via the user interface that the desired peripheral device is not identifying itself. Said differently, the user provides a do not pair command (or pairing instruction) to pairing device 720, or a do not pair command is generated at pairing device 720 in response to the user input.

Pairing device 720 sends a cease identify instruction to keyboard 750 in response to the do not pair command, and the identification module at keyboard 750 disables the identification output in response to the cease identify instruction. A similar sequence or process is then performed with respect to audio device 770.

Pairing device 720 then sends an identify instruction to mouse 790, and the identification module at mouse 790 outputs an identification output to identify itself. After sending the identify instruction to mouse 790, pairing device 720 prompts the user to indicate via the user interface whether the desired peripheral device—here, mouse 790—is identifying itself. The user can then input to pairing device 720 via the user interface that the desired peripheral device is identifying itself. In other words, the user provides an establish pairing command (or pairing instruction) to pairing device 720, or an establish pairing command is generated at pairing device 720 in response to the user input.

Pairing device 720 sends a pairing request to mouse 790 in response to the establish pairing command to initiate a pairing session with mouse 790. In some implementations, mouse 790 disables the identification output in response to the establish pairing command. In other implementations, pairing device 720 also sends a cease identify instruction to mouse 790, in response to which mouse 790 disables the identification output. Mouse 790 and pairing device 720 then participate in the pairing session to establish a pairing. After pairing device 720 and mouse 790 are paired, mouse 790 sends data associated with movement of mouse 790 and/or the state of controls (e.g., buttons or a scroll wheel) of mouse 790 to pairing device 720 via access point 700.

In other implementations, a peripheral device or multiple peripheral devices communicate with a pairing device or a group of pairing devices directly. For example, a peripheral device can communicate with a pairing device via a direct wireless communications link (e.g., a wireless communications link that does not include an intermediary device such as an access point). As a specific example, a peripheral device can communicate with a pairing device via an ad-hoc Wi-Fi™ connection or Wi-Fi Direct™ connection between the pairing device and the peripheral device.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. A non-transitory processor-readable medium storing code representing instructions that when executed at a processor cause the processor to:
   detect a plurality of peripheral devices;
   provide at a first time an identify instruction to a peripheral device from the plurality of peripheral devices; and
   receive at a second time after the first time a pairing instruction associated with the peripheral device.

2. The processor-readable medium of claim 1, wherein the pairing instruction is an establish pairing command, the processor-readable medium further storing code representing instructions that when executed at a processor cause the processor to:
   initiate a pairing session with the peripheral device in response to the pairing instruction.

3. The processor-readable medium of claim 1, wherein the peripheral device is a first peripheral device and the pairing instruction is a do not pair command, the processor-readable medium further storing code representing instructions that when executed at a processor cause the processor to:
   provide at a third time an identify instruction to a second peripheral device from the plurality of peripheral devices; and
   receive at a fourth time after the third time a pairing instruction associated with the second peripheral device.

4. The processor-readable medium of claim 1, wherein the identify instruction is configured to cause the peripheral device to generate an identification output.

5. The processor-readable medium of claim 1, wherein the detecting includes requesting identification information from each peripheral device from the plurality of peripheral devices.

6. The processor-readable medium of claim 1, wherein the detecting includes receiving identification information from each peripheral device from the plurality of peripheral devices without requesting the identification information from each peripheral device from the plurality of peripheral devices.

7. The processor-readable medium of claim 1, further storing code representing instructions that when executed at a processor cause the processor to select, before the providing, the peripheral device from the plurality of peripheral devices.

8. The processor-readable medium of claim 1, further storing code representing instructions that when executed at a processor cause the processor to select, before the providing, the peripheral device from the plurality of peripheral devices in response to input from a user.

9. The processor-readable medium of claim 4, wherein the identification output is an aural output.

10. The processor-readable medium of claim 4, wherein the identification output is a visual output.

11. The processor-readable medium of claim 4, wherein the identification output is a haptic output.

12. The processor-readable medium of claim 1, wherein the instructions further cause the processor to provide a cease identify instruction to the peripheral device in response to a pairing instruction associated with the peripheral device.

13. The processor-readable medium of claim 12, wherein the instructions further cause the processor to:
   select, after providing the cease identify instruction to the peripheral device, a second peripheral device from the plurality of peripheral devices; and
   providing an identify instruction to the second peripheral device.

14. The processor-readable medium of claim 1, wherein the pairing instruction is a do not pair command.

15. The processor-readable medium of claim 12, wherein the instructions further cause the processor to perform:
   selecting, after the providing the cease identify instruction to the peripheral device, a second peripheral device from the plurality of peripheral devices;
   providing an identify instruction to the second peripheral device;
   establishing a pairing with the second peripheral device; and receiving, after establishing the pairing with the second peripheral device, input signals from the second peripheral device.

\* \* \* \* \*